Oct. 19, 1937.  W. SOLLER  2,096,012
SYSTEM FOR TESTING OR MEASURING POTENTIALS
Original Filed Sept. 25, 1933
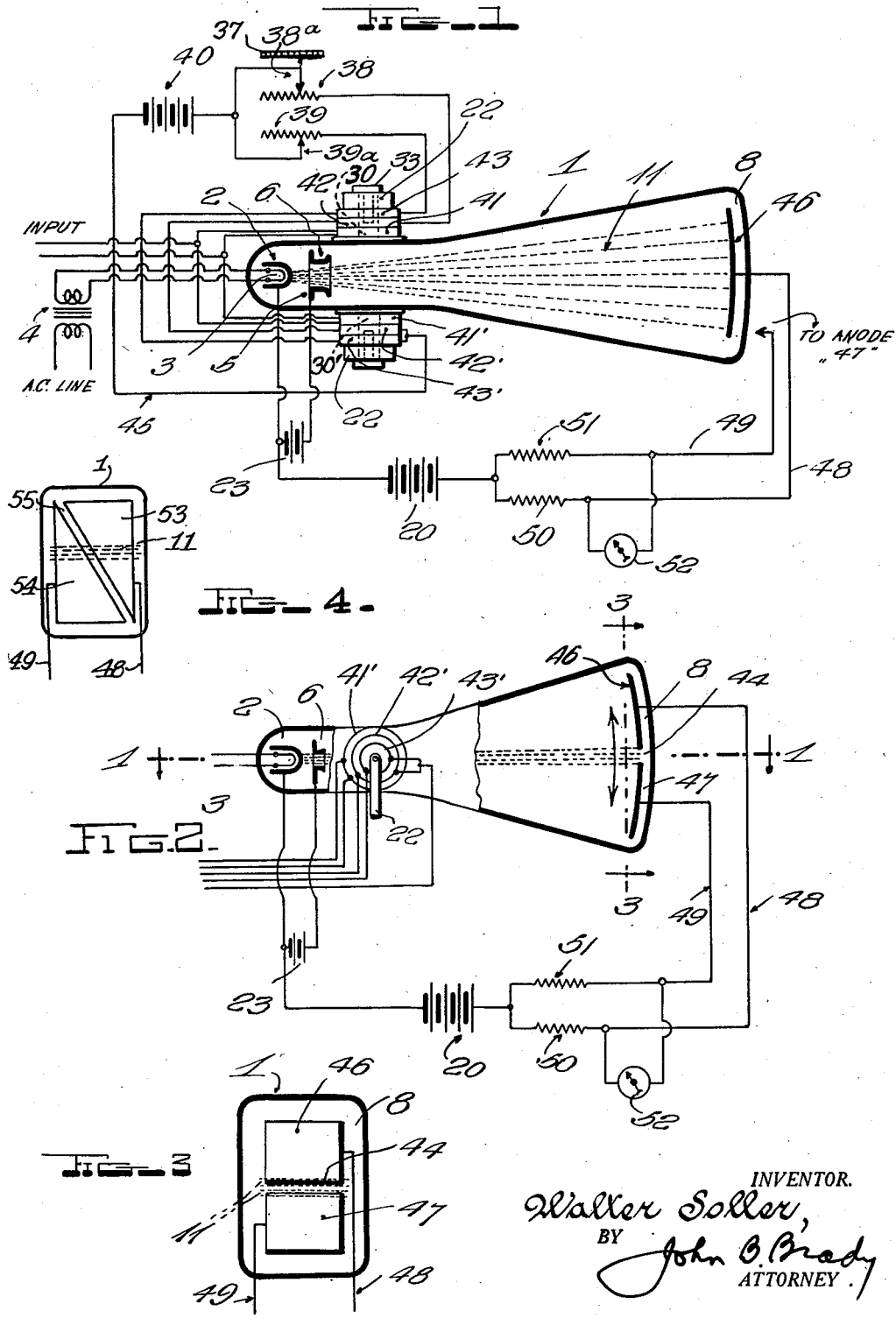
INVENTOR.
Walter Soller,
BY John B. Brady
ATTORNEY.

Patented Oct. 19, 1937

2,096,012

UNITED STATES PATENT OFFICE 2,096,012

SYSTEM FOR TESTING OR MEASURING POTENTIALS

Walter Soller, Tucson, Ariz., assignor of one-half to William H. Woodin, Jr., Tucson, Ariz.

Original application September 25, 1933, Serial No. 690,907. Divided and this application July 23, 1934, Serial No. 736,592

12 Claims. (Cl. 175—183)

My invention relates broadly to electron tube systems and more particularly to an electron tube system for testing or measuring potentials.

This application is a division of my application Serial No. 690,907, filed September 25, 1933, and entitled Electron tube system.

One of the objects of my invention is to provide an electronic system and balanced circuit arrangement for the measurement of very small electric voltages.

Another object of my invention is to provide means for employing a cathode ray discharge tube in a precision measurement circuit for permitting rapid and accurate readings of voltages to be made in various forms of electrical circuits.

A further object of my invention is to provide a method of compensating the displacement of an electron beam in an electron discharge tube according to the voltage to be measured for purposes of precisely determining unknown voltages.

Still another object of my invention is to provide an arrangement of calibrated resistances in association with a galvanometer in a cathode ray tube circuit whereby a balanced condition of the galvanometer may be effected for a particular adjustment of the calibrated resistances from which the voltage values may be directly read.

A further object of my invention is to provide a voltage measurement system employing a cathode ray tube including means for effectively displacing an electronic beam with respect to sets of electrodes and providing compensating means for counteracting the influence of the aforesaid means and measuring the amount of the displacement for determining the value of the impressed voltage.

Other and further objects of my invention reside in the precision measurement circuit as set forth more fully in the specification hereinafter following by reference to the accompanying drawing, in which:

Figure 1 schematically shows the circuit arrangement of my invention for the precision measurement of very small voltages with the cathode ray tube illustrated in horizontal section; Fig. 2 shows the precision measurement circuit of my invention with the cathode ray tube shown in vertical section; Fig. 3 is a view of the plate assembly taken on line 3—3 of Fig. 2; and Fig. 4 is a view similar to Fig. 3 showing a modified form of plate assembly which may be employed in the system of my invention.

Fig. 1 illustrates the circuit for the precision measurement system. The circuit employs an electron tube comprising an envelope shown at 1, of suitable material, preferably of glass and exhausted to a high degree of vacuum or filled with a gas or vapor of a composition generally employed in the art; a cathode element at 2, with heating means shown as a filament at 3, and source of potential at 4; a formative anode shown at 5, having a shaping member 6 and acting to pass a beam of electrons indicated at 11, of rectangular cross-section in an essentially central line with respect to the plate assembly shown at 8; and magnetic control elements at 41, 42, 43, 41', 42' and 43', shown externally of the envelope 1. Three sets of coils numbered 41 and 41', 42 and 42', 43 and 43', are employed and are supported on the cores at 30 and 30', disposed on the removable pole tips 33 of the magnetic yoke 22. Coils at 41, 42 and 43 are disposed at one side of the electron beam shown at 11 and coordinating coils at 41', 42', and 43' on the other side of the electron beam. Coils at 41 and 41' are placed nearest the flange and are connected in parallel to the source of electromotive force to be measured. Coils at 42 and 42' are connected in series with the variable resistance element shown at 38. Coils at 43 and 43' are connected in series with the variable resistance element shown at 39. The adjustable taps at 38a and 39a on resistance elements 38 and 39, respectively, are connected in common to a source of potential indicated as a battery at 40. The other terminal of the source at 40 is connected in common to the other terminals of both series groups through connection numbered 45.

The plate assembly 8 comprises two elements of rectangular shape as shown at 46 and 47 in the plan view of the assembly in Fig. 3. The elements are supported adjacent to each other with a slight separation shown at 44, substantially central to the tube structure so that in normal position, the beam of electrons will fall approximately equally on each element. The elements 46 and 47 have their surfaces disposed in alignment along an arc whose tangent is normal to the discharge path of the beam of electrons.

A modified form of plate assembly is shown in Fig. 4 and comprises two elements of triangular form shown at 53 and 54. The elements supported adjacent to each other with a slight separation shown at 55 disposed diagonally of the electron tube structure. The beam of electrons in normal position will fall approximately equally on each of the elements 53 and 54.

Leads at 48 and 49 connect the elements at 46 and 47, or 53 and 54, to the equal resistances at 50 and 51, respectively, as shown in Fig. 2. The other terminals of the resistances at 50 and 51 are connected in common to the positive terminal of a source of plate potential shown as a battery at 20. The negative terminal of the battery is connected to the cathode. The formative anode 5 is energized from the source of potential at 23 which is also connected to the cathode. The output is taken from the plate terminals shown at 48 and 49 and in this circuit is connected the galvanometer shown at 52.

To place the circuit in operation, bring the cathode to operating temperature. With no input connected to the coils shown at 41 and 41', adjust the resistance at 39 so that the electron beam falls equally on each element of the plate assembly, as shown by galvanometer 52. This condition is attained when the galvanometer 52 due to the difference in the number of electrons falling on each of the elements of the anode assembly shows no deflection, and is checked before each measurement. The voltage to be measured is connected to the coils at 41 and 41' and a deflection is noted on the galvanometer. The resistance at 38 is then adjusted to counteract the applied voltage until the galvanometer again shows no deflection. The resistance at 38 is provided with a calibrated scale 37 to read directly the voltage thus balanced. The calibrated resistance at 38 is returned to zero reading and the resistance at 39 is adjusted to obtain a balanced circuit before each measurement is made. The coils at 41 and 41' cause deflection of the beam in one direction and the coils at 42 and 42' cause deflection in the opposite direction. The coils at 43 and 43', within a limited area, cause deflection in either direction for purposes of balancing.

In the magnetic control system, I have shown the control coils mounted upon a magnetic core but I do not desire to have my invention limited to the use of magnetic cores as I may provide the control coils with air cores thereby enabling the coils to readily function at high frequencies. Furthermore, it is not essential that the control coils be connected in series as the coils may be disposed in parallel as well as series. The structure employed in the system of the tube of my invention is such that the tube may function under control of currents of relatively large amplitude, especially when employing an anode assembly such as that shown in Fig. 4, and the tube is not limited for operation under control of feeble currents. It is also advantageous in some forms of my invention to employ a directive grid electrode in lieu of the formative anode. Such a directive grid electrode may control the form of the electron stream more efficiently than is the case with the formative anode.

The application of the system of my invention to the measurement of very small voltages such as are generated in the thermocouple devices for measuring temperatures, amount of radiation, and the like, is but one of the possible uses.

Although I have described my invention in certain of its preferred embodiments, I desire that it be understood that my invention is not to be limited thereby, but may be modified in arrangement, and no limitations are intended other than are imposed by the scope of the appended claims.

What I claim as new and desire to secure by Letters Patent of the United States is as follows:

1. An electron tube circuit embodying an electron tube device comprising a cathode, a heater element, a formative anode, a plate assembly, said plate assembly comprising a pair of similar elements, a pair of impedance devices, a connection from one of said elements to one of said impedance devices, a connection from the other of said elements to the other of said impedance devices, a source of potential, the other terminals of said impedance devices connected to the positive terminal of said source of potential, the negative terminal of said source of potential connected to said cathode, indicating means having the terminals thereof connected to the terminals of said plate anode elements, a plurality of electromagnetic control coil groups effectively placed in relation to the electron stream emitted from said cathode, one of said coil groups connected in parallel to a source of potential to be measured, a pair of variable resistance devices, a second of said coil groups connected in series with one of said variable resistance devices, a third of said coil groups connected in series with the other of said variable resistance devices, a second source of potential, the other terminals of said variable resistance devices connected in common to one terminal of said second source of potential, the other terminal of said second source of potential connected in common to the other terminals of said second and third coil groups, means comprising one of said variable resistance elements for balancing said circuit with no input connected, and means comprising the other of said variable resistance elements for counterbalancing the effect of the input, said last mentioned variable resistance element calibrated to show the value of the input potential.

2. An electron tube circuit embodying an electron tube device comprising a cathode, a heater element, a formative anode, a plate assembly, said plate assembly comprising a pair of similar elements disposed adjacent each other in surface alignment along an arc whose tangent is normal to the discharge path of electrons in said device, a pair of impedance devices, an indicating meter, a connection from one of said elements to one of said impedance devices and one terminal of said indicating meter, a connection from the other of said elements to the other of said impedance devices and the other terminal of said indicating meter, a source of potential, the other terminals of said impedance devices connected to the positive terminal of said source of potential, and the negative terminal of said source of potential connected to said cathode.

3. A voltage measuring system comprising a cathode ray tube including electron discharge means, sets of electrodes arranged in the discharge path of said means, sources of potential connected between said means and said sets of electrodes, an indicating meter having its terminals connected with the elements of one of said sets of electrodes, an input circuit for effecting a displacement of the electron discharge from said means tending to operate said indicating meter, and means for counteracting the effect of the displacement of the said electron discharge.

4. A voltage measuring system comprising a cathode ray tube including electron discharge means, sets of electrodes arranged in the discharge path of said means, sources of potential connected between said means and said sets of electrodes, an indicating meter having its terminals connected with the elements of one of said sets of electrodes, an input circuit for effecting a displacement of the electron discharge from said means tending to operate said indicating meter, and means calibrated to read voltage values for counteracting the effect of displacement of the aforesaid means and balancing the readings of said indicating meter.

5. A voltage measuring system comprising a cathode ray tube including electron discharge means, sets of electrodes arranged in the discharge path of said means, a set of branch circuits extending between said means and said electrodes, a source of potential common to all of said branch circuits, an impedance device disposed in each of said branch circuits, an indicating meter having one terminal connected to one branch circuit and the other terminal connected to the other branch circuit, input means for controlling the displacement of the electron discharge from said means, and means calibrated according to voltages to be measured for counteracting the operation of said input means with respect to the operation of said indicating meter.

6. A potential testing or measuring system comprising a cathode ray tube including an electron emitter, a pair of electrodes disposed adjacent each other in surface alignment and arranged in the discharge path of said electron emitter, a circuit connected between said electron emitter and each of said electrodes, said circuits including in common a source of potential, and individually, an impedance device connected between said source of potential and each of the electrodes, an indicating meter having its terminals connected with said pair of electrodes, and an input circuit for effecting displacement of the electron discharge from said emitter with respect to said pair of electrodes.

7. A potential testing or measuring system comprising a cathode ray tube including an electron emitter, a pair of electrodes disposed adjacent each other in surface alignment and arranged in the discharge path of said electron emitter, a circuit connected between said electron emitter and each of said electrodes, said circuits including in common a source of potential, and individually, a resistance device connected between said source of potential and each of the electrodes, an indicating meter having its terminals connected with said pair of electrodes, and an input circuit for effecting displacement of the electron discharge from said emitter with respect to said pair of electrodes.

8. A potential testing or measuring system comprising a cathode ray tube including an electron emitter, a pair of electrodes arranged adjacent each other in surface alignment along an arc whose tangent is normal to the discharge path of said electron emitter, a circuit connected between said electron emitter and each of said electrodes, said circuits including in common a source of potential, and individually an impedance device connected between said source of potential and each of the electrodes, an indicating meter having its terminals connected with said pair of electrodes, and an input circuit including magnetic means for effecting displacement of said electron discharge from said emitter with respect to said pair of electrodes for correspondingly controlling the operation of said indicating meter.

9. A voltage measuring system comprising a cathode ray tube including electron discharge means and a differential plate anode assembly comprising elements disposed in surface alignment, indicating means connected to the elements of said differential plate anode assembly, and means energized by the input voltage for deflecting the electron discharge produced by said discharge means, whereby varying amounts of electrons are received by the elements of said differential anode assembly to render operative said indicating means.

10. A voltage measuring system comprising a cathode ray tube including electron discharge means and a differential plate anode assembly, indicating means connected to the elements of said differential plate anode assembly, means energized by the input voltage for deflecting the electron discharge produced by said discharge means, whereby varying amounts of electrons are received by the elements of said differential anode assembly to render operative said indicating means, and manually operable calibrated control means for counteracting the effect produced by the input voltage for determining the value of the input voltage.

11. A voltage measuring system comprising a cathode ray tube including electron discharge means and a differential plate anode assembly consisting of a pair of triangular shaped elements separated by a diagonally disposed gap and arranged with the surfaces thereof in alignment, indicating means connected to said elements, and means energized by the input voltage for deflecting the electron discharge produced by said discharge means vertically across said differential plate anode assembly whereby varying amounts of electrons are received by the said elements to render operative said indicating means.

12. A voltage measuring system comprising a cathode ray tube including electron discharge means and a differential plate anode assembly consisting of a pair of triangular shaped elements separated by a diagonally disposed gap, indicating means connected to said elements, means energized by the input voltage for deflecting the electron discharge produced by said discharge means vertically across said differential plate anode assembly whereby varying amounts of electrons are received by the said elements to render operative said indicating means, and manually operable calibrated control means for counteracting the effect produced by the input voltage for determining the value of the input voltage.

WALTER SOLLER.